(12) United States Patent
Tansley

(10) Patent No.: US 9,909,799 B2
(45) Date of Patent: Mar. 6, 2018

(54) REFRIGERATION APPARATUS

(71) Applicant: The Sure Chill Company Limited, Tywyn (GB)

(72) Inventor: Ian Tansley, Tywyn (GB)

(73) Assignee: The Sure Chill Company Limited (GB)

( * ) Notice: Subject to any disclaimer, the term of this patent is extended or adjusted under 35 U.S.C. 154(b) by 149 days.

(21) Appl. No.: 14/767,904

(22) PCT Filed: Jan. 28, 2014

(86) PCT No.: PCT/GB2014/050218
§ 371 (c)(1),
(2) Date: Aug. 13, 2015

(87) PCT Pub. No.: WO2014/114958
PCT Pub. Date: Jul. 31, 2014

(65) Prior Publication Data
US 2016/0018151 A1 Jan. 21, 2016

(30) Foreign Application Priority Data

Jan. 28, 2013 (GB) .................................. 1301494.9

(51) Int. Cl.
*F25D 16/00* (2006.01)
*F25B 27/00* (2006.01)
(Continued)

(52) U.S. Cl.
CPC ............ *F25D 16/00* (2013.01); *F25B 27/005* (2013.01); *F25D 17/02* (2013.01); *F25D 31/003* (2013.01); *F25D 3/02* (2013.01); *F25D 2331/803* (2013.01)

(58) Field of Classification Search
CPC ........ F25D 16/00; F25D 17/02; F25D 31/003; F25D 3/02; F25D 2331/803; F25B 27/005
See application file for complete search history.

(56) References Cited

U.S. PATENT DOCUMENTS 186,200 A 1/1877 Crisfield
1,594,015 A 7/1926 McLaughlin
(Continued)

FOREIGN PATENT DOCUMENTS

CN 2062629 U 9/1990
CN 2162269 Y 4/1994
(Continued)

OTHER PUBLICATIONS

Colombian Examination Report for Colombian Application No. 14-163243 with International filing date of Jan. 28, 2013; dated Jul. 14, 2015.
(Continued)

*Primary Examiner* — Emmanuel Duke
(74) *Attorney, Agent, or Firm* — Perkins Coie LLP

(57) ABSTRACT

Some embodiments of the present invention provide an apparatus (1) comprising at least one receptacle (42) within which an article (44) can be placed for temperature-controlled storage. The apparatus (1) has a reservoir (10) within which fluid is contained, the reservoir (10) having a cooling region in thermal communication with the at least one receptacle (42). The reservoir (10) includes a headspace containing fluid that is, in use, higher than the at least one receptacle (42). The apparatus (1) has cooling means (30) for cooling fluid within the headspace. The or each receptacle (42) comprises a tube or pouch having an opening defined by an aperture (40) disposed in a wall of the reservoir (10) and extending inwardly into the cooling region so as to be submerged therein.

30 Claims, 11 Drawing Sheets

(51) Int. Cl.
  *F25D 31/00* (2006.01)
  *F25D 17/02* (2006.01)
  *F25D 3/02* (2006.01)

(56) References Cited

U.S. PATENT DOCUMENTS

| | | | |
|---|---|---|---|
| 1,885,837 | A | 11/1932 | Kellogg et al. |
| 1,951,496 | A | 3/1934 | Stevens |
| 1,988,549 | A | 1/1935 | Gibson |
| 2,046,967 | A | 7/1936 | Post, Jr. et al. |
| 2,138,885 | A | 12/1938 | Ross |
| 2,641,109 | A | 6/1953 | Muffly |
| 3,609,991 | A | 10/1971 | Chu et al. |
| 3,721,104 | A | 3/1973 | Adler |
| 4,498,312 | A | 2/1985 | Schlosser |
| 4,509,587 | A | 4/1985 | Clark et al. |
| 4,715,195 | A | 12/1987 | Kucza |
| 4,958,506 | A | 9/1990 | Guilhem et al. |
| 5,129,238 | A | 7/1992 | Schwartz et al. |
| 5,237,835 | A * | 8/1993 | Brochier ............ F25D 17/02 62/336 |
| 5,379,596 | A | 1/1995 | Grayson |
| 5,408,845 | A | 4/1995 | Clarke et al. |
| 5,627,310 | A | 5/1997 | Johnson |
| 5,782,095 | A | 7/1998 | Chen |
| 5,875,599 | A | 3/1999 | McGrath et al. |
| 6,314,751 | B1 | 11/2001 | Gjersvik et al. |
| 6,415,624 | B1 | 7/2002 | Connors et al. |
| 6,469,487 | B2 | 10/2002 | Ewert et al. |
| 6,698,210 | B2 | 3/2004 | Ogura et al. |
| 7,055,575 | B2 | 6/2006 | Noel |
| 7,543,455 | B1 * | 6/2009 | Chen ............ F25B 27/005 62/235.1 |
| 8,215,125 | B2 | 7/2012 | Linder |
| 8,424,335 | B2 | 4/2013 | Corder et al. |
| 8,516,849 | B2 | 8/2013 | Mooijer et al. |
| 8,640,487 | B2 | 2/2014 | Chapa |
| 2002/0050147 | A1 | 5/2002 | Mai et al. |
| 2002/0104318 | A1 | 8/2002 | Jaafar et al. |
| 2003/0070436 | A1 | 4/2003 | Wood et al. |
| 2004/0123620 | A1 | 7/2004 | Porter |
| 2005/0229626 | A1 | 10/2005 | Akopyan |
| 2006/0174648 | A1 * | 8/2006 | Lantz ............ B65D 81/3816 62/371 |
| 2006/0230778 | A1 | 10/2006 | Williams |
| 2006/0248918 | A1 | 11/2006 | Robertson |
| 2006/0277939 | A1 | 12/2006 | Beks et al. |
| 2008/0060374 | A1 * | 3/2008 | Gammons ............ A61F 7/0085 62/259.3 |
| 2008/0092559 | A1 | 4/2008 | Williams et al. |
| 2008/0135564 | A1 | 6/2008 | Romero |
| 2008/0141875 | A1 | 6/2008 | Fahrenback |
| 2009/0151368 | A1 | 6/2009 | Bar |
| 2010/0018221 | A1 | 1/2010 | Flinner et al. |
| 2010/0102057 | A1 | 4/2010 | Long et al. |
| 2010/0293970 | A1 * | 11/2010 | Mooijer ............ F25D 16/00 62/62 |
| 2011/0067852 | A1 | 3/2011 | Farrar |
| 2011/0120151 | A1 | 5/2011 | Cutting et al. |
| 2012/0102994 | A1 * | 5/2012 | Tansley ............ F25D 16/00 62/235.1 |
| 2012/0266627 | A1 | 10/2012 | Lee |
| 2014/0360214 | A1 * | 12/2014 | Tansley ............ F25D 11/006 62/190 |
| 2016/0152402 | A1 | 6/2016 | Su |
| 2016/0216023 | A1 | 7/2016 | Tansley et al. |
| 2016/0243000 | A1 | 8/2016 | Gray |
| 2017/0082344 | A1 | 3/2017 | Tansley |

FOREIGN PATENT DOCUMENTS

| | | |
|---|---|---|
| CN | 1097505 | 1/1995 |
| CN | 1133631 A | 10/1996 |
| CN | 2379760 Y | 5/2000 |
| CN | 1893863 | 1/2007 |
| CN | 201451827 U | 5/2010 |
| DE | 3627201 A1 | 4/1987 |
| DE | 4142842 A1 | 4/1993 |
| DE | 4425213 A1 | 1/1996 |
| EP | 0038864 A1 | 11/1981 |
| EP | 491671 A1 | 6/1992 |
| EP | 0491671 A1 * | 6/1992 ............ F25D 31/007 |
| EP | 0491671 A1 | 6/1992 |
| EP | 505208 A2 | 9/1992 |
| EP | 1538409 A2 | 6/2005 |
| FR | 2537712 A1 | 6/1984 |
| FR | 2562218 A1 | 10/1985 |
| GB | 165684 A | 7/1921 |
| GB | 494531 A | 10/1938 |
| GB | 1429678 A | 3/1976 |
| GB | 2235968 A | 3/1991 |
| GB | 2281773 A | 3/1995 |
| GB | 2430724 A | 4/2007 |
| GB | 2457054 A | 8/2009 |
| GB | 2471865 A | 1/2011 |
| GB | 2503191 | 12/2013 |
| JP | S55-190886 | 7/1982 |
| JP | 58-199268 | 11/1983 |
| JP | S63-243673 | 10/1988 |
| JP | H02-117067 | 5/1990 |
| JP | H04-025338 | 4/1992 |
| JP | H05-003573 | 1/1993 |
| JP | 1993-079741 | 3/1993 |
| JP | H05-79741 A | 3/1993 |
| JP | H08-136108 | 5/1996 |
| JP | H08-313141 | 11/1996 |
| JP | 10144361 A | 5/1998 |
| JP | H11-238530 | 8/1999 |
| JP | 2001133109 A | 5/2001 |
| JP | 2001221553 A | 8/2001 |
| JP | 2001227847 A | 8/2001 |
| JP | 2002013855 A | 1/2002 |
| JP | 2003148849 A | 5/2003 |
| JP | 2003254567 | 9/2003 |
| JP | 2004043020 A | 2/2004 |
| JP | 48-027260 | 11/2011 |
| JP | 2012002496 | 1/2012 |
| JP | 49-036282 | 5/2012 |
| SU | 898226 A1 | 1/1982 |
| WO | WO-2002018210 | 3/2002 |
| WO | 2009005008 A1 | 1/2009 |
| WO | 2009072876 A1 | 6/2009 |
| WO | 2010086167 A1 | 8/2010 |
| WO | 2011007162 A2 | 1/2011 |
| WO | 2013089678 A1 | 6/2013 |
| WO | WO-2013110957 | 8/2013 |

OTHER PUBLICATIONS

Colombian Examination Report for Colombian Application No. 15-202569 with International filing date of Jan. 28, 2014; dated Sep. 9, 2016.

Exam Report for Egyptian Application EG2012010066 filed Dec. 1, 2012; 7 pages.

Exam Report for Egyptian Application EG2014071169, dated Aug. 1, 2016; 7 pages.

Examination Report for Canadian Application No. 2,767,864, dated May 13, 2016, 4 pages.

Examination Report for United Kingdom Patent Application No. GB1201437.9, dated Apr. 7, 2014, 2 pages.

Final Office Action dated Aug. 29, 2016, for U.S. Appl. No. 13/383,118, of Tansley, Ian filed Jan. 9, 2012.

Final Office Action dated Nov. 5, 2014, for U.S. Appl. No. 13/383,118, of Tansley, Ian filed Jan. 9, 2012.

First Office Action dated Apr. 21, 2016, for Eurasian Patent Application No. 201491428, 5 pages.

First Office Action dated Dec. 26, 2014, for Eurasian Patent Application No. 201270161.

First Office Action dated Jun. 2, 2015, for Japanese Patent Application No. 2012-520097.

(56) References Cited

OTHER PUBLICATIONS

First Office Action dated Mar. 25, 2015, for Vietnamese Patent Application No. 1-2012-00156.
First Office Action dated Nov. 12, 2014, for Mexican Patent Application No. MX/a/2012/000719.
First Office Action dated Nov. 6, 2015 for Chinese Patent Application No. 201380017447.3, 66 pages, with English Translation.
First Office Action dated Sep. 5, 2014, for Phillipines Patent Application No. 12012500102.
Great Britain Examination Report for GB Application 1401455.9; dated Sep. 15, 2014.
International Search Report and Written Opinion dated Apr. 4, 2011, for International Patent Application No. PCT/GB2010/051129 filed Jul. 9, 2010.
International Search Report and Written Opinion dated May 6, 2015, for International Patent Application No. PCT/GB2014/050218 filed Jan. 28, 2014.
International Search Report and Written Opinion dated Sep. 26, 2014, for International Patent Application No. PCT/GB2014/052255 filed Jul. 23, 2014.
Non-Final Office Action dated Aug. 3, 2016, for U.S. Appl. No. 13/383,118, of Tansley, Ian filed Jan. 9, 2012.
Non-Final Office Action dated Jul. 14, 2015, for U.S. Appl. No. 13/383,118, of Tansley, Ian filed Jan. 9, 2012.
Non-Final Office Action dated Mar. 12, 2014, for U.S. Appl. No. 13/383,118, of Tansley, Ian filed Jan. 9, 2012.
Office Action in Eurasian Patent Application No. 201591385/31, dated Aug. 30, 2016, 6 pages.
Office Action in Thailand Patent Application No. 1401004332, dated May 28, 2015, 1 page.
Patent Examination Report No. 1 for Australian Application No. 2015202391, dated May 2, 2016, 3 pages.
Restriction Requirement Action dated May 16, 2016, for U.S. Appl. No. 15/003,386 of Tansley, Ian filed Jan. 21, 2016.
Restriction Requirement dated Dec. 31, 2013, for U.S. Appl. No. 13/383,118, of Tansley, Ian filed Jan. 9, 2012.
Second Office Action dated Apr. 3, 2015, for Eurasian Patent Application No. 201270161.
Second Office Action dated Aug. 26, 2016 for Chinese Patent Application No. 201380017447.3, 37 pages, with English Translation.
Second Office Action dated Aug. 4, 2015, for Japanese Patent Application No. 2012-520097.
Second Office Action dated Jul. 1, 2015, for Mexican Patent Application No. MX/a/2012/000719.
Second Office Action dated Jun. 1, 2015, for Phillipines Patent Application No. 12012500102.
Substantive Search and Examination Report dated May 11, 2014, for ARIPO Application No. AP/P/2012/006111 filed Sep. 7, 2010, 32 pages.
Substantive Search and Examination Report dated May 11, 2014, for ARIPO Application No. AP/P/2014/007819 filed Jan. 28, 2013, 4 pages.
Third Office Action dated Mar. 28, 2016, for Eurasian Patent Application No. 201270161, 4 pages.
U.S. Appl. No. 15/003,386 of Tansley, Ian filed Jan. 21, 2016.
Exam Report dated Jan. 5, 2017 for Egyptian Application EG2012010066 with English Translation, filed Dec. 1, 2012; 7 pages.
Examination Report for Canadian Application No. 2,767,864, dated Feb. 21, 2017, 3 pages.
Examination Report dated Mar. 24, 2017 in European Patent Application No. 13705226.2, 4 pages.
Examination Report dated Oct. 19, 2016 in European Patent Application No. 10739675.6, 5 pages.
Examiner's Office Action dated Apr. 7, 2017 in Philippines Patent Application No. 1-2014-501668.
Final Office Action dated Aug. 16, 2017 in U.S. Appl. No. 15/262,486 of Tansley, Ian, filed Sep. 12, 2016.
Final Office Action dated Feb. 5, 2016, for U.S. Appl. No. 13/383,118, of Tansley, Ian filed Jan. 9, 2012.
First Office Action dated Jun. 27, 2017 in Chinese Patent Application No. 201480052383.5, with English translation.
First Office Action dated Nov. 28, 2016 in Chinese Patent Application No. 201510186465.5, with English translation, 20 pages.
International Search Report and Written Opinion PCT/GB13/50184 dated Oct. 2, 2013, pp. 1-9.
International Search Report and Written Opinion PCT/US16/51273 dated Jan. 26, 2017, pp. 1-10.
Non-Final Office Action dated Apr. 27, 2017 in U.S. Appl. No. 14/373,580 of Tansley, Ian filed Jul. 21, 2014.
Non-Final Office Action dated Jan. 31, 2017 in U.S. Appl. No. 15/262,486 of Tansley, I. filed Sep. 12, 2016.
Non-Final Office Action dated May 12, 2016 in U.S. Appl. No. 13/383,118 of Tansley, Ian filed Jan. 9, 2012.
Notice of Allowance dated Dec. 2, 2016 for U.S. Appl. No. 13/383,118 of Tansley, Ian filed Jan. 9, 2012.
Notice of Allowance dated Jan. 30, 2017 for U.S. Appl. No. 15/003,386 of Tansley, Ian filed Jan. 21, 2016.
Notice of Preliminary Rejection in Korean Patent Application No. 10-2012-7000384, dated Oct. 20, 2016, with English Translation, 35 pages.
Office Action for Japanese Patent Application No. 2014-553809 with English Translation, dated Jan. 4, 2017, 21 pages.
Office Action in Japanese Patent Application No. 2015-236753 with English translation, dated Apr. 11, 2017, 10 pages.
Office Action in Japanese Patent Application No. 2015-236753 with English translation, dated Oct. 25, 2016, 14 pages.
Restriction Requirement dated Jan. 4, 2017 in U.S. Appl. No. 14/373,580 of Tansley, Ian filed Jul. 21, 2014.
Search and Examination Report for United Kingdom Patent Application No. GB1413094.2, dated Jan. 23, 2015, 5 pages.
Second Office Action dated Aug. 11, 2017 in Chinese Patent Application No. 201510186465.5, with English translation, 17 pages.
Second Office Action dated Dec. 21, 2016 in Eurasian Patent Application No. 201491428/31, with English translation, 3 pages.
Second Office Action dated Dec. 3, 2014 in Philippines Patent Application No. 12012500102, 3 pages.
Substantive Search and Examination Report dated Aug. 4, 2016 in ARIPO Application No. AP/P/2014/007819, 4 pages.
Substantive Search and Examination Report dated Nov. 5, 2014 in ARIPO Application No. AP/P/2012/006111, 32 pages.
Third Office Action date Feb. 23, 2017 in Chinese Patent Application No. 201380017447.3, with English translation, 33 pages.
Third Office Action dated Aug. 30, 2017 in Eurasian Patent Application No. 201491428/31, with English translation, 4 pages.
Office Action for Brazil Application No. PI1015971-1, dated Oct. 10, 2017, 1 page.

* cited by examiner

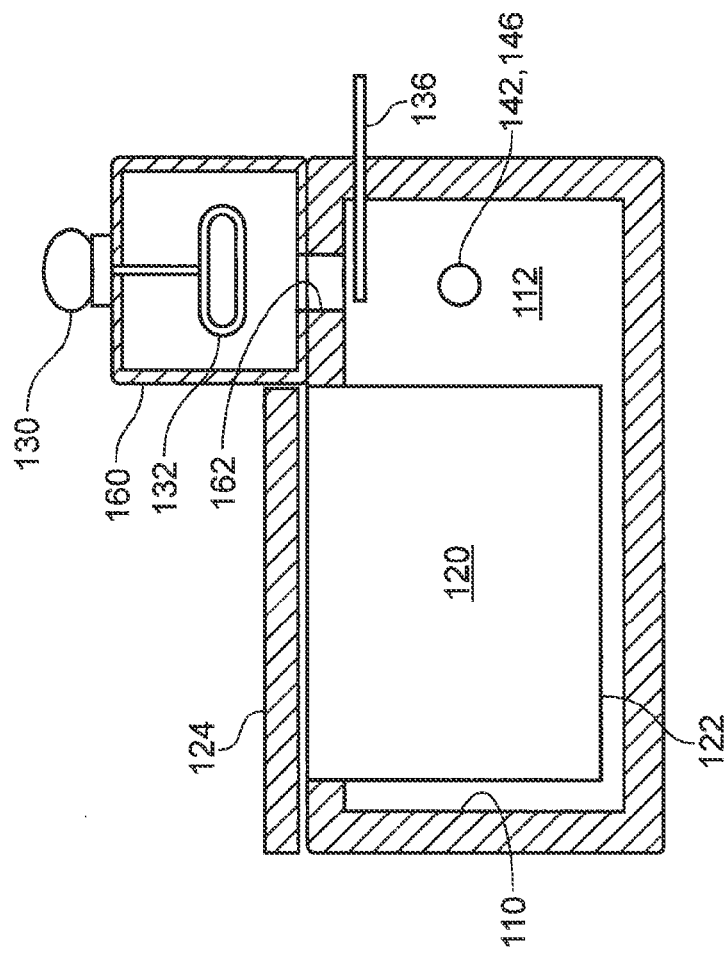
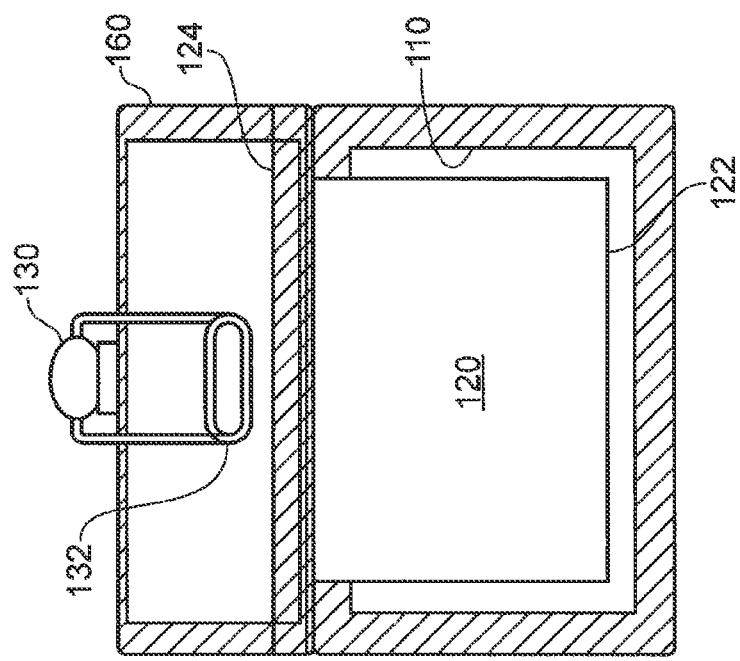
FIG. 5
FIG. 4

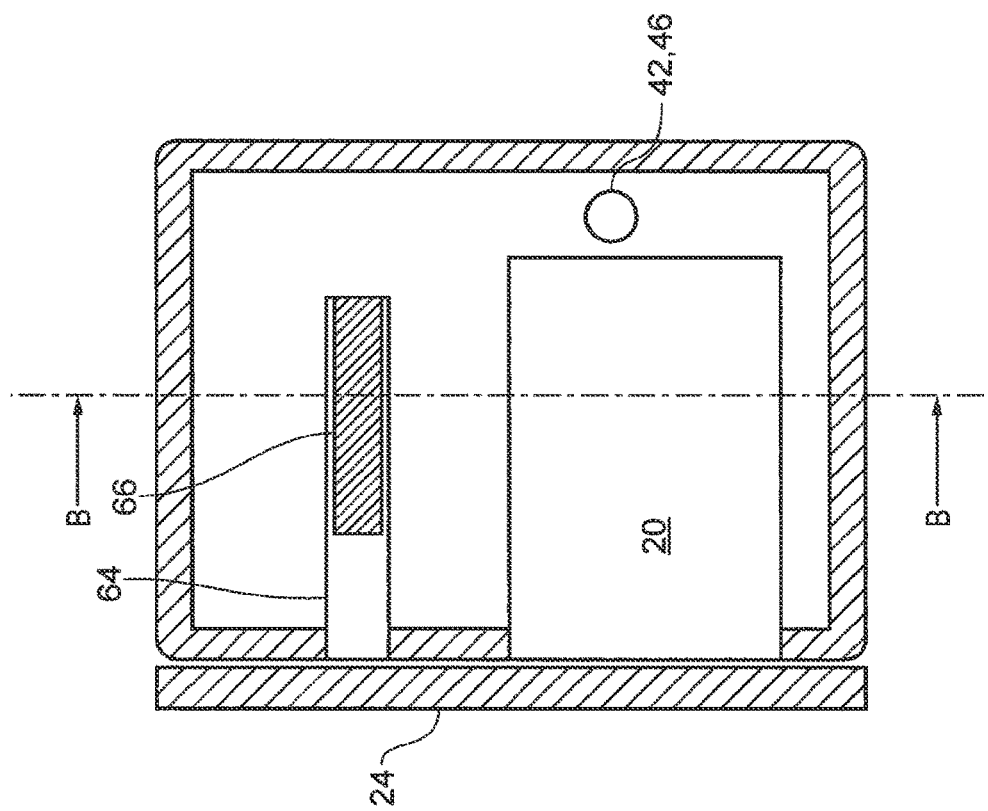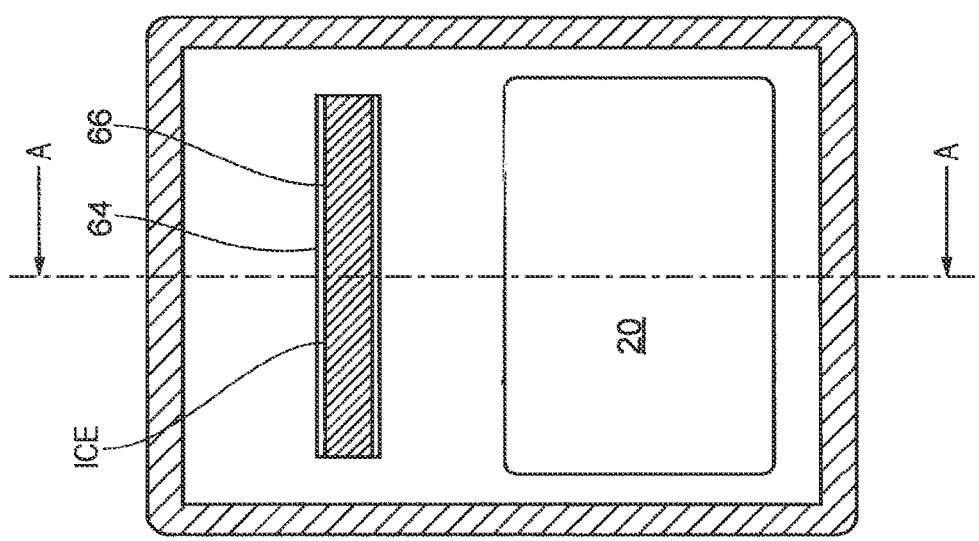

REFRIGERATION APPARATUS

PRIORITY CLAIM

This application is the U.S. National Phase Patent Application of PCT International Patent Application No. PCT/GB2014/050218, entitled "REFRIGERATION APPARATUS" and filed on Jan. 28, 2014, which claims priority to U.K. Patent Application No. 20130001494 entitled "REFRIGERATION APPARATUS" and filed on Jan. 28, 2013. The contents of the above-identified applications are incorporated herein by reference in their entirety.

FIELD OF THE INVENTION

This invention relates to a refrigeration apparatus and particularly, but not exclusively, to a refrigeration apparatus for use in storing and transporting vaccines, perishable food items or packaged beverages in the absence of a reliable supply of electricity. Aspects of the invention relate to an apparatus and to a method.

BACKGROUND

One of the greatest problems facing the distributors of vaccines in underdeveloped countries is that their viability can be destroyed by storage at improper temperatures. In general, a vaccine must be stored between +2° C. and +8° C. This is an especially difficult problem because, in many regions, this temperature must be maintained in the absence of a reliable (and potentially of any) supply of electricity to run a refrigerator, and this results in an unacceptably high proportion of all vaccines being ineffective by the time they reach their intended target.

Similar problems arise with the storage of food, particularly perishable food items, and packaged beverages such as canned or bottled drinks required to support aid workers and the local population in such circumstances.

It is natural that refrigerators that rely upon alternative sources of energy have been sought, and photovoltaic generation of electricity from sunlight has been seen as the most promising. A problem with any device that relies upon the sun as a source of energy is that the source is unavailable during night time. Conventionally, solar-powered refrigeration apparatus is provided with a rechargeable battery that is charged during daylight and which runs the apparatus at night. However, it is well known that the life of rechargeable batteries is diminished by exposure to high temperature. Failure of the battery can occur with little warning, meaning that the refrigerator can stop working resulting in spoiled contents. The life of the battery is typically much less than other components of a refrigerator: typically no more than five years for the battery, whereas the refrigerator as a whole may last twenty.

In view of these problems, the World Health Organisation (WHO)—the organisation that sets the standards for vaccine refrigerators—now encourages the use of batteryless solar refrigerators in distribution chain for vaccines in future.

One approach to meeting this requirement is to include a cold reservoir within the refrigerator, separated from a payload space of the refrigerator by a thermal barrier. The cold reservoir is a thermal mass that is cooled to a low temperature (perhaps as low as −30° C.) while solar power is available. When power becomes unavailable, the reservoir can absorb heat from the payload space. An important disadvantage of this arrangement is that it is difficult to maintain the temperature of the payload within the required temperature range. This type of apparatus presents a particular risk of overcooling vaccines: freezing can result in their immediate destruction. Freezing can also destroy many food items, such as fresh vegetables, or cause containers that contain water or other water-based beverages to burst.

It is against this background that the present invention has been conceived. The applicants have recognised that there is a need for an apparatus and/or method for reliably cooling items, such as packaged beverages, within a desired temperature range for extended periods without requiring a constant source of mains electrical power.

The present applicants have previously proposed a new form of refrigeration apparatus which addresses the above problems. This apparatus, which is the subject of co-pending patent application no. PCT/GB2010/051129, permits a refrigerated storage space to be maintained within a temperature range of 4-8° C. for up to 30 days following a loss of electrical power.

The applicants have recognised that the technical principles employed in this apparatus may be adapted for use in an apparatus or method for cooling packaged beverages, such as canned or bottled drinks. The demand for chilled beverages is high even in underdeveloped countries since these generally coincide with regions having a hot climate with high average annual temperatures.

Embodiments of the invention may therefore provide an apparatus or a method for cooling a plurality of packaged beverages and maintaining same within a desired temperature range for extended periods of time without a continuous external supply of electrical power. Other aims and advantages of the invention will become apparent from the following description, claims and drawings.

STATEMENT OF INVENTION

Aspects of the invention therefore provide an apparatus and a method as claimed in the appended claims.

According to another aspect of the invention for which protection is sought, there is provided a refrigeration apparatus having at least one receptacle within which one or more beverage containers such as bottles or cans can be placed for temperature-controlled storage, a thermally-insulated reservoir within which the receptacle is located, the reservoir containing fluid that at least partially immerses the receptacle and extends into a headspace that is higher than the receptacle; and cooling means that can cool fluid within the headspace.

According to another aspect of the invention for which protection is sought, there is provided a refrigeration apparatus having at least one receptacle within which one or more articles such as one or more beverage containers such as bottles or cans can be placed for temperature-controlled storage, a thermally-insulated reservoir within which the receptacle is located, the reservoir containing fluid that at least partially immerses the receptacle and extends into a headspace that is higher than the receptacle; the apparatus being configured to permit cooling means to be disposed in thermal communication with fluid in the headspace thereby to cool said fluid, in use.

In an embodiment, the or each receptacle comprises a tube or pouch having an opening defined by an aperture disposed in a wall of the reservoir and extending inwardly into the cooling region so as to be submerged therein.

In one aspect of the invention for which protection is sought there is provided an apparatus comprising:

at least one receptacle within which an article can be placed for temperature-controlled storage;

a reservoir within which fluid is contained, the reservoir having a cooling region in thermal communication with the at least one receptacle, the reservoir including a headspace containing fluid that is, in use, higher than the at least one receptacle; and cooling means for cooling fluid within the headspace, wherein the or each receptacle comprises a tube or pouch having an opening defined by an aperture disposed in a wall of the reservoir and extending inwardly into the cooling region so as to be submerged therein.

The cooling means may be comprised by the apparatus, for example an electrical cooling element.

In an advantageous embodiment, the fluid is water. The fluid may be any suitable fluid having a critical temperature above which a density of the fluid decreases with increasing temperature and below which a density of the fluid decreases with decreasing temperature. The fluid may advantageously be a liquid.

As is well known, water has its maximum density at 4° C. Therefore, if water is employed, then as water in the headspace is cooled towards 4° C., its density will increase and it will therefore tend to sink towards the bottom of the reservoir. Since the receptacle will adopt a temperature at or around that of the surrounding water, it will tend towards 4° C., which is an ideal temperature for storage of packaged beverages such as water or carbonated drinks. The receptacle may be separated from the refrigeration unit, so avoiding the risk of its contents (or of its walls) dropping towards freezing point.

In an embodiment, the or each receptacle comprises a tube or pouch having an opening defined by an aperture disposed in a wall of the reservoir and extending inwardly into the cooling region so as to be submerged therein.

In an embodiment, the or each tube or pouch is closed at its end distal from the opening.

In an embodiment, the or each receptacle is formed from an elastomeric material.

In an embodiment, the or each receptacle tapers from its end proximal to the opening towards its end distal to the opening.

The apparatus may comprise at least two receptacles, the end of each receptacle distal to its respective opening being connected.

In an embodiment a receptacle is provided in the form of a tube having openings at opposite ends each of which is defined by an aperture in a wall of the refrigerator.

In an embodiment, the or each receptacle is arranged to permit transfer of heat from an article such as a beverage container held therein to fluid contained in the cooling region.

The cooling means may include a refrigeration unit that can cool fluid within the headspace, and a power supply unit that can act as a source of power for the refrigeration unit. The power supply may comprise a solar power supply, such as a plurality of photovoltaic cells, for converting sunlight into electrical power. Alternatively, or in addition, a mains power supply may be used.

In typical embodiments, the refrigeration unit includes an electrically-powered compressor. However, refrigeration units using other refrigeration technology might be used to increase the electrical efficiency of the refrigerator. One example of such alternative technology is a Stirling engine cooler, which may be operated in solar direct drive mode.

To minimise the risk of the or each receptacle being cooled to too low a temperature, the apparatus may further comprise a sensor disposed to detect the formation of ice in the reservoir. The sensor may be operative to cause operation of the refrigeration unit to be interrupted upon detection of the formation of ice.

In alternative embodiments of the invention, the cooling means includes a thermal mass that, for use, is at a temperature below a target temperature of the payload space. This can provide a refrigerator that is simple in construction and that has no moving parts in operation. For example, the thermal mass may be a body of solidified fluid such as water ice. Such an arrangement may be used on its own or in combination with a refrigeration unit. This combination within the cooling means can cool the refrigerator to its working temperature more quickly than can the refrigeration unit alone.

Such embodiments may include a compartment for receiving the thermal mass in thermal communication with fluid in the headspace. For example, the compartment may be suitable for receiving ice. Alternatively, the thermal mass may be immersed in fluid within the headspace. In this latter case, the thermal mass may be an ice pack.

The or each receptacle may be contained within the cooling region. For example, it may be submerged within the cooling region. This allows maximal heat transfer between the payload space and the fluid.

The headspace may be located, in use, directly above the at least one receptacle. In such embodiments, the receptacle typically has an opening on one side of the payload container to permit insertion of an article such as a beverage container. In an embodiment, a closure member such as a door may be provided to close the opening.

Most typically, the or each receptacle is in close thermal communication with the fluid in the reservoir. This ensures that an article (e.g. a beverage) may be maintained at a temperature approximately that of the fluid. The reservoir may be insulated to minimise transfer of heat between fluid within the reservoir and surroundings of the refrigerator.

Embodiments of the invention may further include a freezer compartment. Typically, the freezer compartment is in close thermal communication with a cooling element of the refrigeration unit. This ensures that it is cooled to a significantly lower temperature than the fluid. The freezer compartment may have an opening that is closed by an insulated door. The insulated door may or may not also close the payload container.

An advantageous form of construction of embodiments of the invention may have an outer case within which is contained a fluid-containing liner. The liner may be formed of flexible plastic material. In these embodiments, the outer case typically provides structural strength and thermal insulation for the refrigerator.

In an aspect of the invention for which protection is sought there is provided a method for cooling an article container comprising: cooling fluid stored in a headspace of a reservoir; permitting higher density fluid to sink from the reservoir into a cooling region located below the headspace; and disposing the article container in the cooling region so as to be cooled by the fluid, the method comprising providing the article container in the form of a tube or pouch having an opening defined by an aperture disposed in a wall of the reservoir and extending inwardly into the cooling region so as to be submerged therein.

In an aspect of the invention for which protection is sought there is provided an apparatus for cooling beverage containers, such as bottles or cans comprises a plurality of receptacles within which beverage containers can be placed for temperature-controlled storage. A reservoir within which fluid is contained includes a cooling region in thermal communication with the at least one receptacle and a headspace containing fluid that is, in use, higher than the at least one receptacle. Cooling means are provided for cooling fluid within the headspace.

Within the scope of this application it is envisaged that the various aspects, embodiments, examples, features and alternatives set out in the preceding paragraphs, in the claims and/or in the following description and drawings may be taken independently or in any combination thereof.

DETAILED DESCRIPTION OF EMBODIMENTS

The present invention will now be described, by way of example only, with reference to the accompanying drawings, in which:

FIGS. 4 and 5 are front and side views of an apparatus embodying a second form of the invention;

FIGS. 10 and 11 are sectional views of a front-loading refrigerator being a sixth embodiment of the invention;

Operation of embodiments of the present invention rely upon one of the well-known anomalous properties of liquids having a critical temperature, being a temperature at which a density of the liquid is a maximum. That is, above the critical temperature the fluid has a positive temperature coefficient of thermal expansion and below the critical temperature the fluid has a negative temperature coefficient of thermal expansion.

Figure 1:
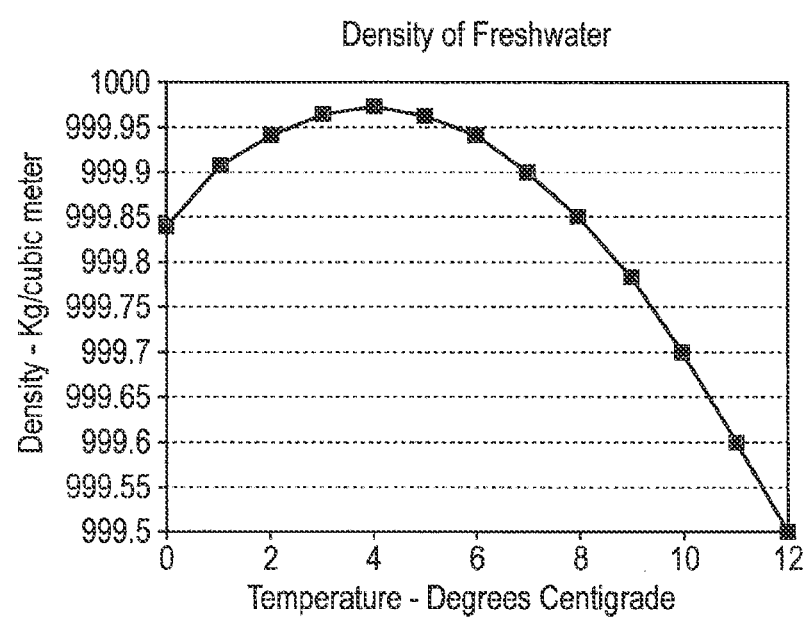
FIG. 1 is a graph of the density of water against temperature.

In the case of relatively pure water, the density is a maximum at approximately 4° C., as shown in FIG. 1. This means that a tank of water that is cooled close to its top will form a temperature gradient, whereby water towards the bottom of the tank will approach 4° C. The temperature at the bottom of the tank will not fall below this value unless the greater part of the water in the tank becomes frozen. It is to be understood that in the case of water the criticial temperature may be adjusted by addition of additives or impurities to the water, such as salts to reduce the critical temperature.

Figure 2:
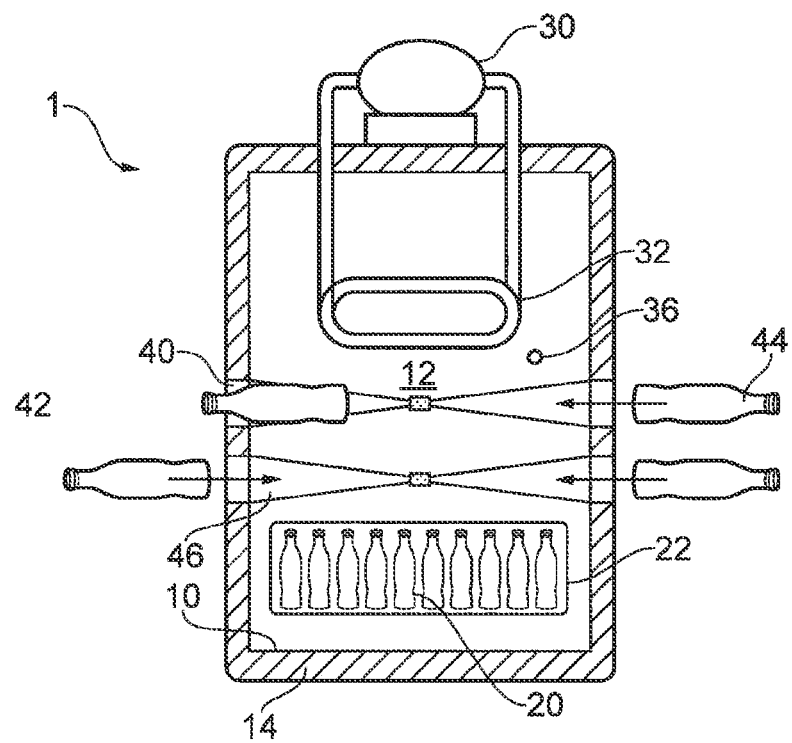
FIGS. 2 and 3 are front and side views of an apparatus embodying a first form of the invention.
Figure 3:
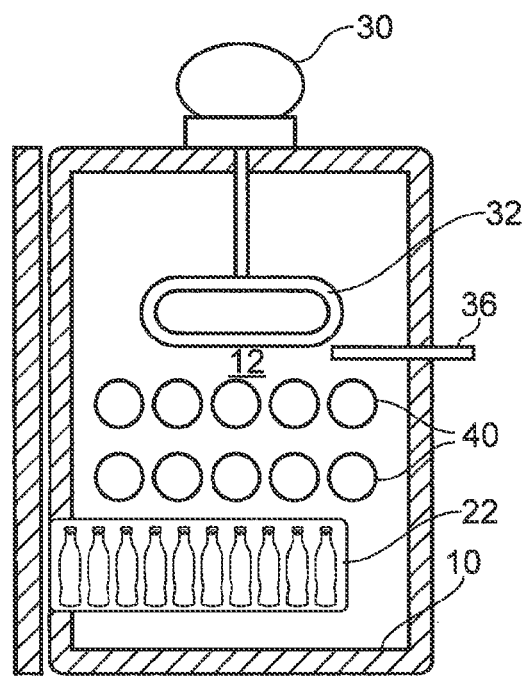

With reference to FIGS. 2 and 3, an apparatus, in the form of a refrigerator, embodying a first form of the invention is shown generally at 1.

The apparatus 1 comprises a casing 10, which is, in this embodiment, shaped generally as an upright cuboid. The casing 10 is constructed to be a reservoir that, in use, contains a volume of water within an internal space 12. For instance, the casing 10 may be formed as a one-piece rotational moulding of plastic material. Insulating material 14 is carried on outer surfaces of the casing 10 to minimise flow of heat through the casing to or from the water contained within it. The water largely fills the internal space 12, but a small volume may be left unfilled to allow for expansion.

A payload space 20 is formed within the casing 10. The payload space 20 is located within a generally cuboidal box 22 that has one open face that opens horizontally to the exterior of the casing. In the illustrated embodiment, the payload space 20 extends from close to the lowermost surface of the internal space 12 of the casing to a height approximately one quarter of the height of the internal space 12. Nevertheless, the volume of the payload space can be selected as desired. The other faces are located within the casing 10 and are submerged under the water that is contained within the casing 10. The submerged faces of the cuboidal box 22 have no insulation so that they are in thermal communication with the surrounding water in a cooling region of the reservoir. The box 22 may optionally be integrally formed with the casing 10.

A door 24 is mounted on the casing 10. The door 24 can be opened to gain access to the payload space 20 through the open face. Insulating material is carried on the door 24 so that, when it is closed, it minimises the amount of heat that can be transferred through it into or out of the payload space 20.

A refrigeration unit 30 is carried on a top surface of the casing 10. In this embodiment, the refrigeration unit is a conventional electrical compressor-based cooling unit. The refrigeration unit 30 has a cooling element 32 that extends into the internal space 12 of the casing 10 and is submerged in the water. The cooling element 32 is located in a water-filled headspace above the box 22 such that it is spaced from the box 22 by a layer of water and likewise spaced from the uppermost surface of the internal space 12. (Alternatively, the refrigeration unit 30 may have a wrap-around evaporator that surrounds the headspace.) An optional ice probe 36 is located within the casing 10 above the box 22 but below the cooling element. The ice probe 36 is electrically connected to control the refrigeration unit 30, as will be described below.

The refrigerator has an external power supply to feed the refrigeration unit 30. The power supply can operate from a supply of mains power in the absence of bright sunlight. The power supply can also operate from photovoltaic panels, whereby the refrigeration unit 30 can be run without the need of a mains supply during sunny daytime conditions.

A plurality of apertures 40 are provided in the side walls 10a, 10b of the casing 10 each defining an opening into a respective receptacle 42 for holding a beverage container such as a bottle or carbonated drinks can 44. In the illustrated embodiment, twenty receptacles 42 are provided, each side wall 10, 10b comprising ten apertures 40 in two horizontal rows of five. The receptacles are disposed approximately at a mid height within the casing 10, between the box 22 and the cooling element 32.

Each receptacle 42 comprises an inwardly-directed, closed ended tube, sock or pouch 46 which, in the illustrated embodiment, is formed from a flexible or elastomeric material such as rubber and takes the shape of a cone, being narrower at its closed end than at the end adjacent to the opening 40.

Each pouch 46 is sized such that insertion of a beverage container 44 therein causes the elastomeric material to stretch around the body of the container. This permits the container 44 to be gripped securely by the tube, preventing it from falling out during use or transportation. In addition, the surface area of the tube in physical contact with the container 44 is increased, thereby improving or optimising thermal transfer between the water in the internal space 12 and the container 44.

In order to prevent pressure from the water in the internal space 12 causing the pouch 46 to collapse or prolapse through the opening 40, opposing pouches 46 are attached to each other at their closed ends. In an alternative embodiment (not shown), the closed end of each pouch 46 is attached or pinned to the inner surface of the opposing wall of the container 10.

Operation of the refrigerator will now be described.

When the refrigerator is first started, it can be assumed that all of the water is at or around the ambient temperature. The refrigeration unit 30 is run to cause its refrigeration element 32 to cool to a temperature that is typically well below the freezing point of water—for example, as low as −30° C. This, in turn, causes water in the immediate surroundings of the cooling element to cool. As the water cools, its density increases. This sets up a convection current, whereby the cooled water sinks in the casing 10, so displacing warmer water below. This warmer water rises, and is, in turn, cooled. The average temperature of all of the water within the casing 10 falls. However, once the temperature of the water surrounding the cooling element 32 approaches 4° C., the rate of convection decreases. This causes the lower part of the water to become comparatively stagnant, with a temperature of around 4° C. The water immediately surrounding the cooling element may fall below this, or may eventually freeze. However, the ice formed by this freezing will be less dense than the warmer water below, so the ice will float upwards. Ice may continue to form, and grow downwards as cooling continues. Once the growing ice reaches and is detected by the ice probe 36, power to the refrigeration unit 30 is cut, so no further ice will form.

In this embodiment, there is still a clear layer of liquid water between the lowest part of the ice and the uppermost receptacles 42, such that any beverage container held within the receptacles 42, as well as the box 22 and anything within the payload space 20, will remain above the freezing point of water at a temperature of approximately 4° C. However, the extent to which ice can be allowed to grow in any particular embodiment without potentially harming the beverages or the payload can be determined by experimentation.

Once the refrigeration unit 30 stops, assuming that ambient temperature is higher than the temperature of the water, energy will pass through the walls of the casing 10 into the water, which will start to warm. In the reverse of the cooling process, water in the lower part of the casing 10 will tend to stay around 4° C. while the ice melts. Following complete melting, the water will continue to warm, but water above 4° C. will tend to rise to the top of the casing 10. Thus, the receptacles 42 and the payload space 20 will be maintained at or around 4° C. for as long as possible. As is well-known, a large amount of energy is required to melt ice—the latent heat of fusion. This acts as a sink of a large amount of energy that is absorbed by the water, the receptacles 42 and the payload space 20 being maintained at a substantially constant temperature during the time that the ice melts. The beverages 44 held by the receptacles 42 and the contents of the box 22 are therefore maintained at around 4° C., which is an ideal temperature for storage of vaccines, food and beverages.

FIGS. 4 and 5 show a second embodiment of the invention: this has essentially the same components as the first embodiment. However, their layout is somewhat different. In the following description, components of the second embodiment will be given reference signs that are 100 greater than the corresponding components of the first embodiment.

In the second embodiment, the casing 110 is comparatively squatter in shape than that of the first embodiment. The opening of the box 122 faces upwards, and the door 124 opens upwards. Water surrounds the box on all sides but for the top opening, with the internal space 112 including an additional volume adjacent to one side of the box 122. A receptacle 142 is provided in the form of a pair of pouches 146 disposed end to end and immersed in the internal space 112. Items may be placed in the receptacle 142 via apertures formed in the casing 110 in a similar manner to the embodiment of FIGS. 2 and 3. A receptacle 142 in the form of a tube may used as an alternative. A supplementary chamber 160, also containing water, is located on an upper surface of the box 122 above the additional headspace volume and adjacent to the door 124. A passage 162 interconnects the supplementary chamber 160 and the additional volume of the internal space 112 that allows water to pass between them. An ice sensor 136 is located adjacent to the passage 162 within the internal space 112.

A refrigeration unit 130 is carried on an upper surface of the supplementary chamber 160, with a cooling element 132 extending from it into the supplementary chamber 160.

This embodiment operates substantially as described above. Water that is cooled within the supplementary chamber passes into the internal space 112 through the passage 162. As before, the water that is densest—that at round 4° C.—sinks into the internal space 112 to cool the receptacle 142, box 122 and any items contained within them.

Figure 6:
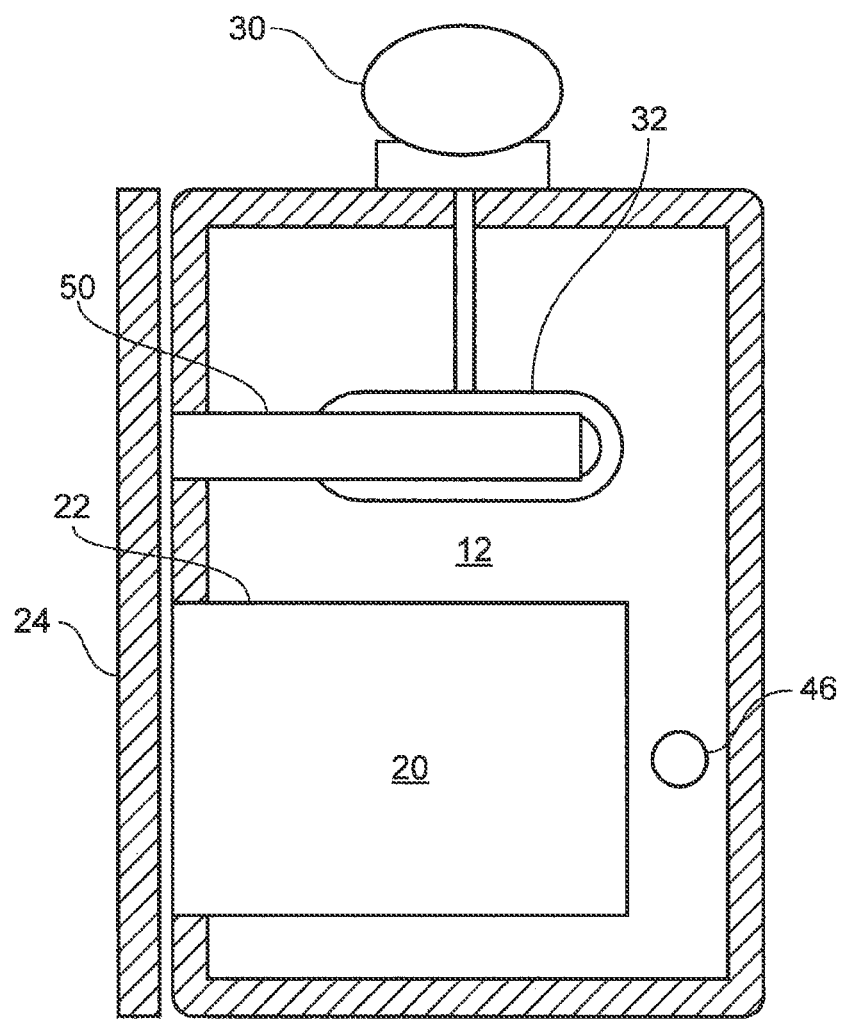
FIG. 6 is a side view of a front-loading refrigerator and freezer, being a third embodiment of the invention.
Figure 7:
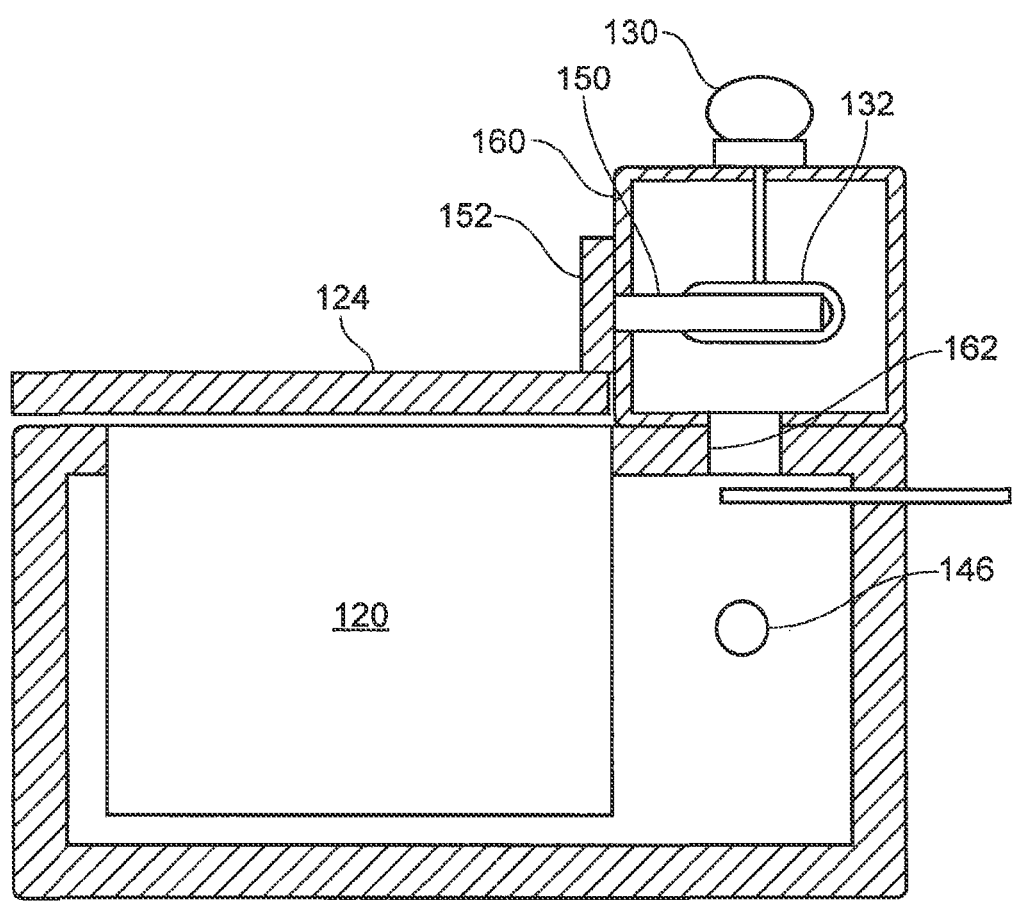
FIG. 7 is a side view of a top-loading refrigerator and freezer, being a fourth embodiment of the invention.

The third embodiment, shown in FIG. 6 corresponds closely to the first embodiment of FIGS. 2 and 3, while the fourth embodiment of FIG. 7 corresponds closely to the second embodiment of FIGS. 4 and 5. Therefore, only the additional features present will be described.

The third and fourth embodiments add the ability to maintain items in a frozen condition to the first and second embodiments. The freezer compartment is in close thermal contact with a cooling element, such that it is cooled to a temperature well below that of the water.

In the third embodiment, a freezer compartment 50 is provided, that has similar construction to the payload space 22, and similarly has a horizontal opening that is closed by the door 24. The freezer compartment 50 is located directly above the payload space, in close proximity to, or surrounded by, the cooling element 32 of the refrigeration unit 30.

In the fourth embodiment, the opening of the freezer compartment 150 is horizontal and above that of the payload space 120. In the fourth embodiment, the opening of the freezer compartment 150 is horizontal and beside that of the payload space 120. The freezer compartment 150 is enclosed within the supplementary chamber 160, in close proximity to, or surrounded by, the cooling element 132 of the refrigeration unit 130. In this embodiment, the freezer compartment 150 has an insulated door 152 that is separate from the door 124 of the payload space 120. The door 152 closes a horizontal opening of the freezer compartment 150.

Figure 8:
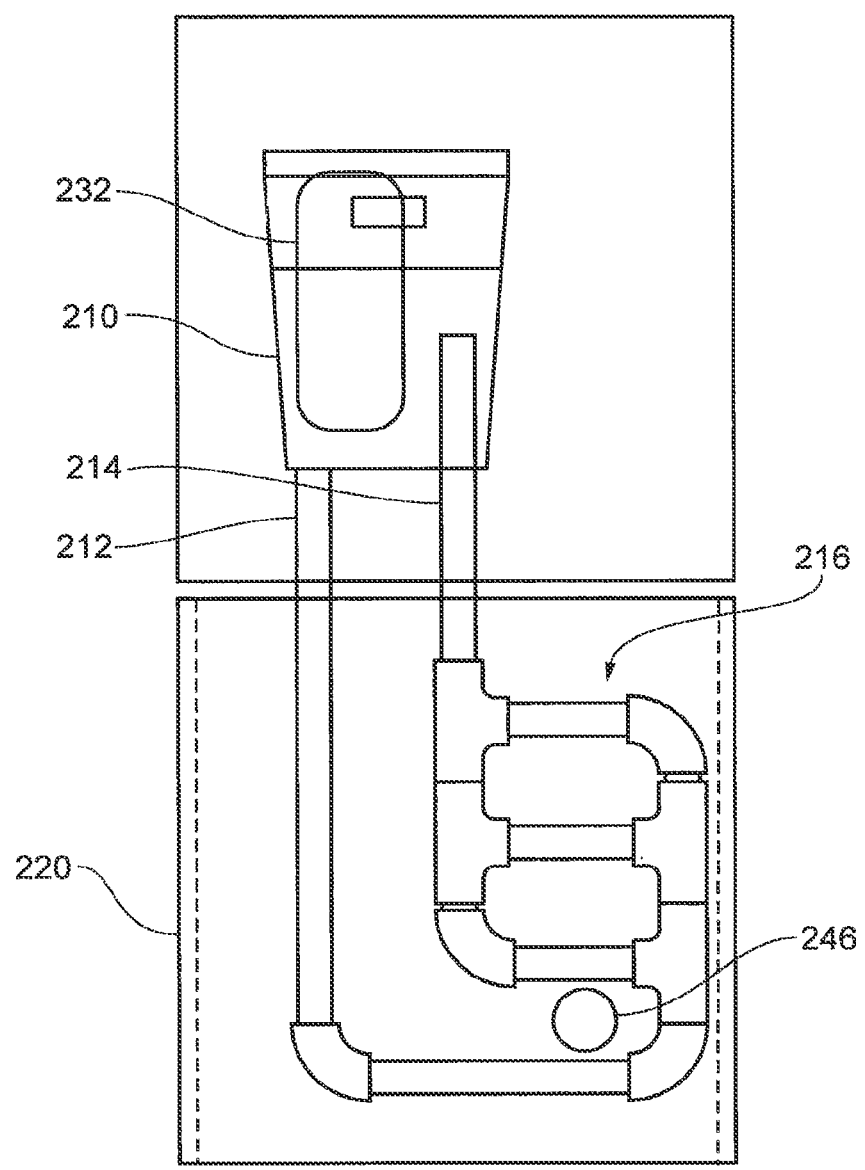
FIG. 8 is a schematic section of a fifth embodiment of the invention.

A fifth embodiment, shown in FIG. 8, has a somewhat different construction from the previous embodiments, but operates on the same principles.

In this embodiment, the reservoir comprises an upper compartment 210 mounted above a payload container 220 to form a headspace. The reservoir includes first and second water ducts 212, 214 that extend generally downwards, when in use, into the payload container 220. The first duct 214 opens into the headspace at or close to a lowermost wall, while the second duct 214 extends upwards into water contained within the headspace. Within the payload container 220, a manifold of several pipes 216 are connected to flow in parallel between the two ducts 212, 214. A refrigeration unit is provided with cooling elements 232 that can cool water within the headspace.

As with the preceding embodiments, the densest water will tend to flow towards the bottom of the reservoir—in this case, into the ducts 212, 214 and manifold 216 within the payload container 220, where heat can be exchanged between the water within the reservoir and the contents of the payload container 220. A thermo-siphon process becomes established that transfers heat away from the payload container into the headspace as the temperature of the payload container falls towards 4° C.

A receptacle 242 in the form of a pair of pouches 246 disposed end to end is disposed to pass through the payload container 220, being cooled by air within the payload container 220 that has been cooled by liquid in the ducts 212, 214 and manifold 216. In some embodiments the receptacle 242 may be provided in substantially direct thermal contact with the ducts 212, 214 and/or manifold 216. In some embodiments the receptacle 242 may be provided in substantially direct thermal contact with fluid within the ducts 212, 214 and/or manifold 216. Any suitable number of receptacles 242 in the form of a pouch and/or tube may be provided through the payload container 220 to allow cooling of articles within the pouches and/or tubes 246.

It is to be understood that some embodiments of the present invention allow relative easy access to articles stored in the pouches and/or tubes 46, 146, 246. In some embodiments this is due at least in part to the fact that the one or more apertures in the casing of the refrigerator allowing articles to be placed in and removed from one or more receptacles 46, 146, 246 may be open and not closed by means of a closure such as a door. Optionally, a self-closing closure member may be provided such as a flap, curtain or the like, optionally formed from a flexible plastics material. This feature has the advantage of reducing inflow of heat to a receptacle 46, 146, 246 in use.

In yet further embodiments, there may be several payload containers within the reservoir to allow items that are to be carried to be kept separate.

Figure 9:
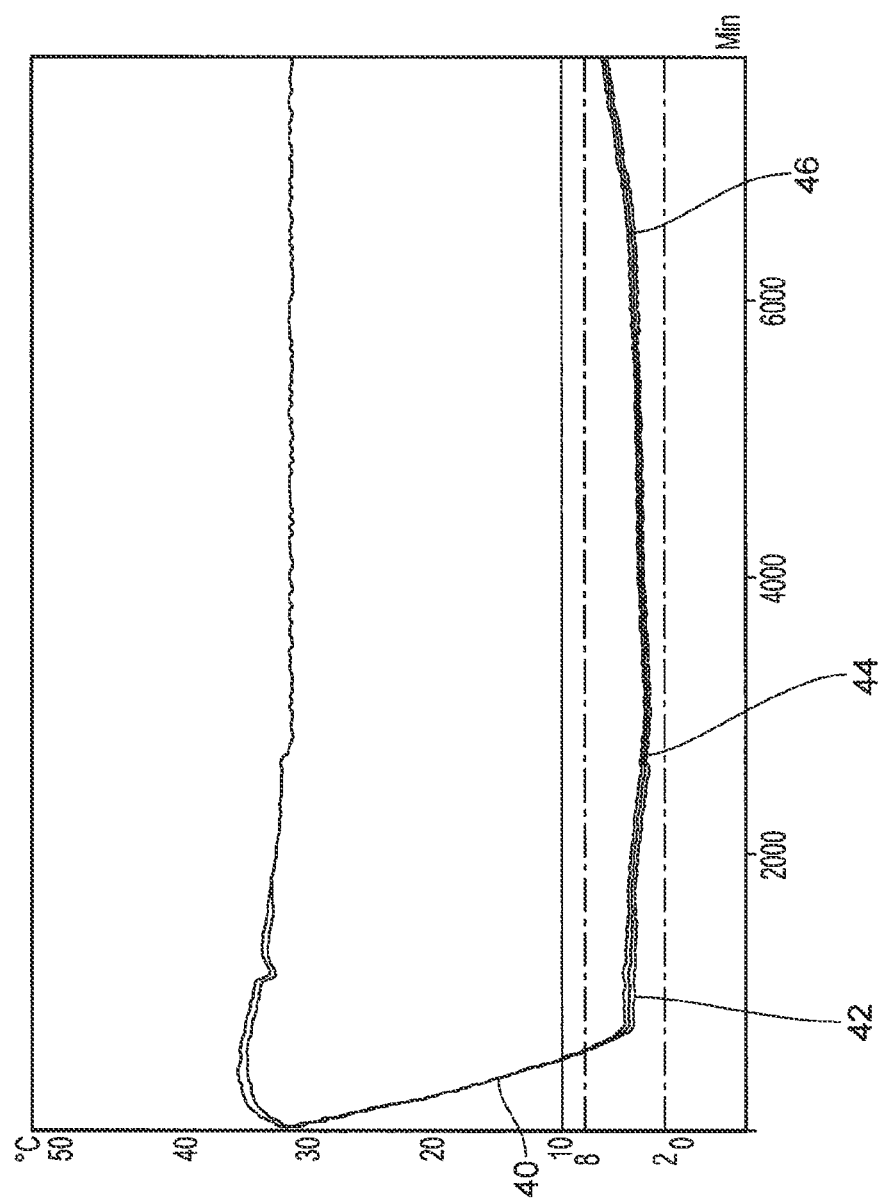
FIG. 9 is a graph showing changes in temperature within a payload space or a receptacle of an embodiment of the invention.

As shown in FIG. 9, when the refrigeration unit 30, 130 is first turned on (at 0 on the X-axis), the temperature in the payload space 20, 120 (as shown by the trace 40) drops quickly to 4° C., when the temperature stabilises (at 42). The temperature does not drop substantially, notwithstanding that refrigeration unit 30 continues to run. At 44, the refrigeration unit stops. The temperature in the payload space 20 then rises only very slowly for a considerable amount of time before starting to rise more rapidly. In the example shown in FIG. 9, the refrigeration unit runs for 9 hours and 40 minutes before the payload space reaches the maximum tolerable value of 8° C. Approximately an hour later, the temperature has dropped to 4° C. The refrigeration unit 30, 130 is then run for a further 34 hours approximately, without the temperature dropping significantly. Once the refrigeration unit 30, 130 is stopped, roughly 58 hours passes without a substantial rise in temperature. Then the temperature does start to rise, but over 16 hours passes before the maximum permissible 8° C. is reached.

This performance is substantially beyond that required by the World Health Organisation for vaccine storage, and is ideally suited for use with a power supply that relies upon energy derived from sunlight. It is significantly more than adequate to maintain the contents at the required temperature overnight, and, should it be necessary, through a period of cloudy weather when the supply of electrical power is limited. It should be noted that this level of performance is reached without any backup source of power such as a rechargeable battery.

The above description assumes that the maximum density of water occurs at 4° C., which is the case for pure water. The temperature at which the maximum density occurs can be altered by introduction of impurities into the water. For example, if salt is added to the water to a concentration of 3.5% (approximately that of sea water) then the maximum density occurs at nearer 2° C. This can be used to adjust the temperature of the payload space for specific applications.

Figure 12:
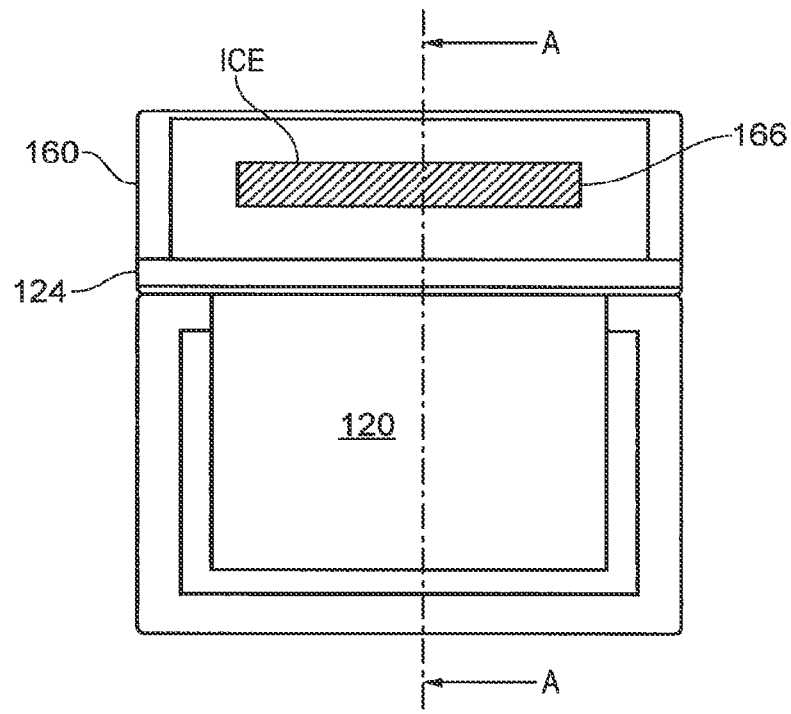
FIGS. 12 and 13 are sectional views of a top-loading refrigerator being a seventh embodiment of the invention.

Further, simpler alternative embodiments of the invention are shown in FIGS. 10 to 13. The embodiment of FIGS. 10 and 11 is similar to the third embodiment, and the embodiment of FIGS. 11 and 12 is similar to the fourth embodiment. In each case, the refrigeration unit 30, 130 and the associated cooling element 32, 132 is omitted. Consequentially, no source of electrical power is required.

Instead, in the embodiment of FIGS. 10 and 11, a water-tight compartment 64 is provided. The compartment 64 extends into the headspace at substantially the same location as the freezer compartment 50, 150 of the earlier embodiments. Access to a space within the compartment 64 can be reached from an opening that is closed by a door 24, 152 in much the same way as the freezer compartments 50, 150. The material of the compartment 64 is chosen to have a high thermal conductivity to ensure efficient heat transfer between contents of the compartment 64 and water surrounding it.

For use, the compartment 64 is filled with a body of cold material 66, 166. The body of cold material 66, 166 is at a temperature that is below the intended operating temperature of the payload space 20, 120. It will typically be well below 0° C. A temperature of around −18° C. can be obtained by placing the body in a conventional food freezer before use, and −30° C. or less would emulate the effect of a refrigeration unit. In a manner similar to transfer of heat from the water to the cooling element 32, 132 of preceding embodiments, heat is absorbed by the body of cold material from the water through the material of the compartment 64. In this way, the payload space 20, 120 is cooled by dense water cooled to approximately 4° C. (or to another temperature at which the water and any of its additives is at its densest).

Figure 13:
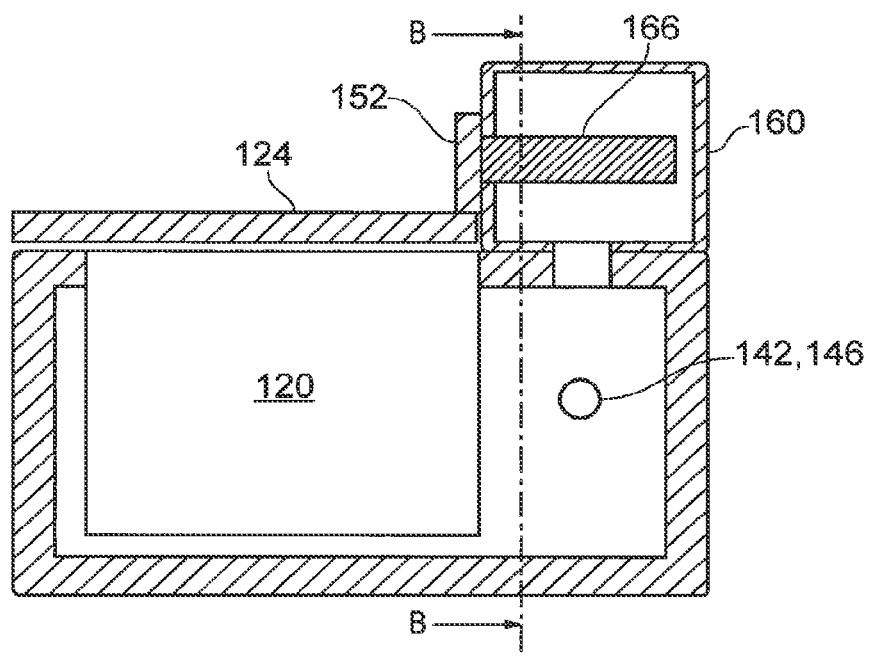

The body of cold material can be anything with a suitable thermal mass. However, water ice is particularly suitable because it is readily available and has an advantageously high latent heat of fusion. The ice may be in the form of standard 0.6 liter ice packs 166 that are used in transport and storage of medical supplies. If ice packs are to be used, the compartment could be omitted altogether, with the ice packs being placed directly within the water of the headspace, as shown in FIGS. 12 and 13. (Of course, the embodiment of FIGS. 12 and 13 could be modified to include a compartment as in the embodiment of FIGS. 10 and 11, and the embodiment of FIGS. 10 and 11 could be modified by the omission of the compartment.)

Figure 14:
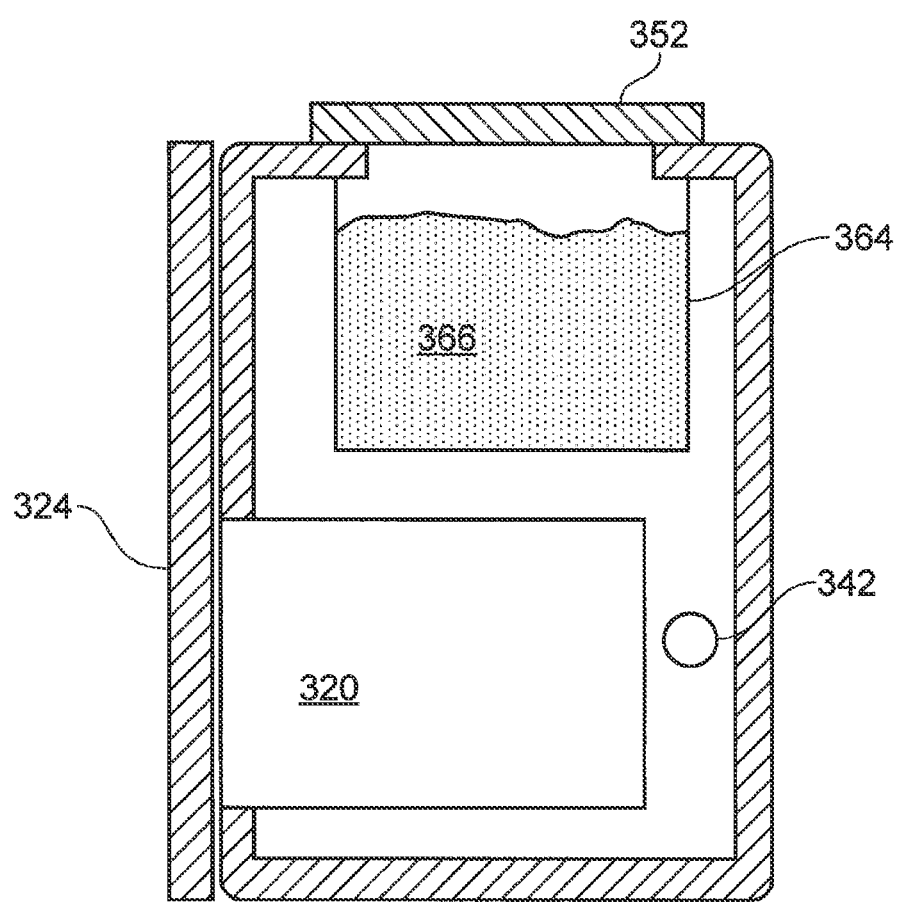
FIG. 14 is a sectional view of an eighth embodiment of the invention.

Another embodiment that makes use of a thermal mass is shown in FIG. 14. In this embodiment, an container 364 is located above the payload container 320 submerged in water within the headspace. The container 364 is formed of a material that allows heat to be transferred from water within the headspace to its contents. The container 364 has an opening through which its interior can be reached from outside of the refrigerator, the opening being closed by a thermally-insulated cover 352. In this embodiment, the opening of the container faces upward when the refrigerator is in use.

This embodiment functions in a manner similar to those described above that make use of a thermal mass. Cold material 366, most typically water ice, is introduced into the container 364 through the opening. Heat then moves from water in the headspace to the ice within the container, thereby cooling the water and the contents of the receptacle 342 and payload container 320, in accordance with the principles described above. The arrangement of the opening shown in FIG. 14 allows the ice to be introduced quickly and easily into the container.

It is surmised that a refrigerator with a payload space of 60 liters can be maintained within a required temperature range for between 7 and 30 days, with a requirement of 100 liters of ice to achieve the upper end of this range.

Figure 15A:
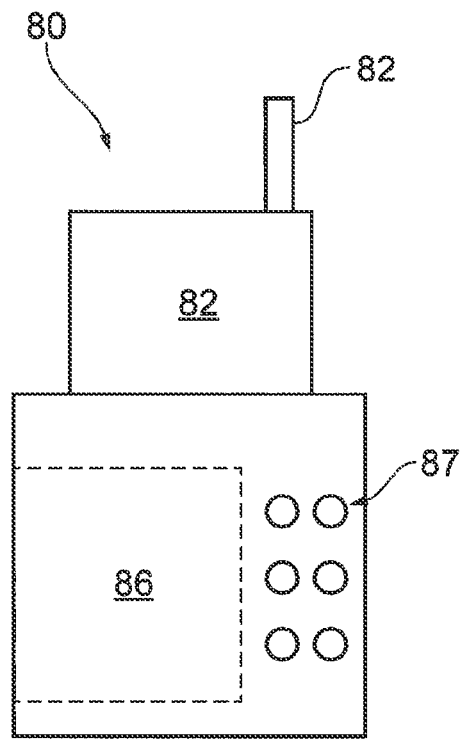
FIGS. 15a to 15c are orthographic views of a watertight liner for use with an embodiment of the invention.
Figure 15B:
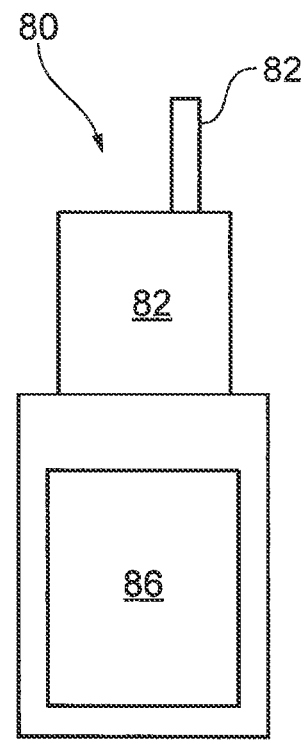
Figure 15C:
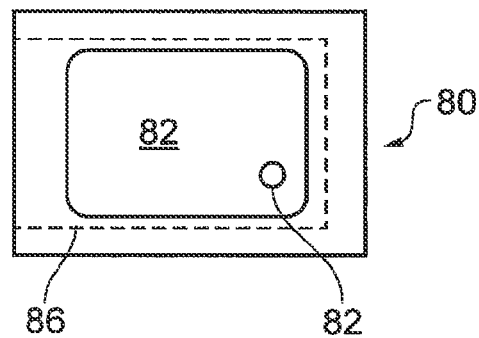

Clearly, in some embodiments of the invention, it is important to ensure that the water or other fluid be maintained within the refrigerator in a manner that leakage and evaporation is substantially prevented. This can be quite difficult to achieve for a refrigerator that is likely to be subject to rough handling and shock as it is transported in rugged vehicles on poorly-surfaced roads or entirely off-road. Therefore, one system for constructing a refrigerator embodying the invention is to provide a rigid outer case that provides the overall shape, structural strength and thermal insulation, and to line the case with a watertight liner 80 formed from flexible plastic material. Such a liner is shown in FIGS. 15a to 15c.

It will be understood that the liner 80 will be shaped and dimensioned in accordance with the particular embodiment with which it will be used, and that the figures illustrate just one example configuration. The example shown in FIGS. 15a to 15c will be suitable for use in a front-entry refrigerator. It includes a headspace 82, a filling pipe 84, and a recess 86 within which the payload space is contained. The liner also has tubes 87 formed from the same of a similar flexible plastic material, the tubes being arranged to traverse a width of the liner from on side to the other. The tubes may be arranged to receive articles directly therein. Optionally, tubular inserts of corresponding size are provided, that are inserted into the tubes 87 to provide a surface to bear articles to be cooled so as to reduce a risk of puncture of the tubes 87 of the liner 80. In some embodiments the tubes 87 may be formed from a rigid plastics material that is more resistant to puncture. The rigid plastics material may be welded or otherwise permanently attached to the flexible plastics liner 80.

In use, the weight of the water causes the material of the liner 80 to deflect, so as to conform closely to the payload space, thereby ensuring effective heat transfer between the payload space, tubes 87 and water within the liner 80. Small deflections of or damage to the outer case will not result in leakage of the liner 80. In the event that the liner does leak, it can be replaced readily and at relatively low cost.

It will be appreciated that some embodiments of the present invention provide a novel and inventive device for storing and cooling items such as vaccines, perishable food items as well as a plurality of beverage containers such as bottles or drinks cans, providing a temperature controlled storage means which can be maintained within a desirable temperature range following loss of power to the device for many hours. Embodiments of the invention are arranged to passively regulate the flow of heat energy inside the device, to enable long-term storage of temperature sensitive products.

The above described embodiments represent advantageous forms of the invention but are provided by way of example only and are not intended to be limiting. In this respect, it is envisaged that various modifications and/or improvements may be made to the invention within the scope of the appended claims.

For example, while only FIGS. 3 and 4 illustrate the provision of receptacles 42, it is expressly stated that any of the other embodiments shown in the appended drawings or described hereinabove can include one or more such receptacles 42.

The number and precise positioning of the receptacles 42 with respect to the internal space 12 or the box 22 is not critical and can be selected as desired. However, any receptacles provided should advantageously be positioned below the headspace and spaced from the cooling element 32 to prevent over-cooling.

In some embodiments, the box 22 may be eliminated and the apparatus 1 may be used exclusively for the cooling articles in the receptacles 42, such as beverage containers 44. In these embodiments, an even greater number of receptacles 42 may be provided and the apertures 40 may thus extend from close to the bottom wall of the casing 10 to a point approximately mid way or higher towards the upper wall.

The or each receptacle 42 may take any form suitable for receiving one or more beverage containers 44. For example, as an alternative to the elastomeric pouch having a substantially closed end within the internal space 12 of the reservoir, each receptacle 42, 142, 242, 342 may comprise a rigid, closed ended, cylindrical tube which is suitably sized in length and diameter for receiving a beverage container along a greater portion of its length. The use of such rigid tubes, which may be formed from a material having a high thermal transmissivity such as a metal material, may facilitate insertion and removal of beverage containers 44 by the user. However, any air space between the walls of the container and the tube may adversely affect thermal transfer between the container and the water.

In one embodiment, each receptacle 42, 142, 242, 342 comprises a tube extending fully between respective opposing apertures 40 on the side walls 10a, 10b of the casing 10. In this case, each receptacle 42 may be capable of receiving a number of beverage containers 44 disposed end to end therein and which can be accessed, i.e. inserted or removed, from either end of the tube. For example, insertion of a beverage container 44 into the receptacle 142, which may be a tube, may cause a container to be "extruded", i.e. pushed out, of the tube at the other end. Conveniently therefore, removal of a chilled container from one end of the receptacle can be achieved by insertion of a container to be chilled into the opposite end of the receptacle.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An apparatus comprising:
   a casing surrounding a reservoir within which fluid is contained, while in use, the reservoir having:
   a cooling region and
   a headspace disposed substantially above the cooling region and in fluid communication with the cooling region;
   cooling means for cooling fluid within the headspace; and
   a pair of receptacles within which an article can be placed for temperature-controlled storage;
   wherein the pair of receptacles comprises a tube or pouch having an ends proximal to a pair of opposite openings, the openings defined by apertures disposed in opposite sides of walls of the casing and extending inwardly into the cooling region of the reservoir to join in a middle of the cooling region so as to be submerged therein, during use, the pair of receptacles in thermal communication with the cooling region.

2. The apparatus of claim 1, wherein the pair of receptacles is closed at a respective end distal from the opening.

3. The apparatus of claim 2, wherein the pair of receptacles taper from the each respective opening towards its end distal to the opening.

4. The apparatus of claim 1, wherein the pair of receptacles is formed from an elastomeric material.

5. The apparatus of claim 1, wherein each receptacle of the pair of receptacles comprises a pouch.

6. The apparatus of claim 1, wherein the pair of receptacles comprise a tube extending through the reservoir within the casing, the tube having openings at opposite ends each of which is defined by an aperture on opposing walls of the casing.

7. The apparatus of claim 1, wherein the pair of receptacles are arranged to permit transfer of heat from an article held therein to fluid contained in the cooling region.

8. The apparatus of claim 1, wherein the cooling means includes a refrigeration unit.

9. The apparatus of claim 8, further comprising:
   a power supply configured to provide power to the refrigeration unit.

10. The apparatus of claim 9, wherein the power supply includes means for converting sunlight into electrical power.

11. The apparatus of claim 10, wherein the means for converting sunlight into electrical power includes a plurality of photovoltaic cells.

12. The apparatus of claim 9, wherein the power supply derives power from an external power source.

13. The apparatus of claim 12, wherein the external power source is mains electricity.

14. The apparatus of claim 8, wherein the refrigeration unit includes an electrically-powered compressor.

15. The apparatus of claim 1, further comprising sensor means disposed within the reservoir, the sensor means configured for detecting the formation of solidified fluid in the reservoir.

16. The apparatus of claim 15, wherein the sensor is operative to cause operation of the cooling means to be interrupted upon detection of the formation of ice.

17. The apparatus of claim 1, wherein the cooling means includes a thermal mass which, in use, is at a temperature below a target temperature of the at least one receptacle.

18. The apparatus of claim 17, wherein the thermal mass is a body of ice.

19. The apparatus of claim 17, further comprising a compartment for receiving the thermal mass.

20. The apparatus as claimed in of claim, 17 wherein the thermal mass is immersed in fluid within the headspace.

21. The apparatus of claim 17 wherein the thermal mass is an ice pack.

22. The apparatus of claim 1, further comprising:
   a payload container within which items can be placed for temperature-controlled storage, the payload container being submerged within the cooling region of the reservoir, wherein the payload container includes a face open to an exterior of the casing and at least one other face in thermal communication with the cooling region.

23. The apparatus of claim 22, wherein the headspace is located, in use, directly above the receptacle and the payload container.

24. The apparatus of claim 1, wherein the casing around the reservoir is insulated to minimize transfer of heat between fluid within the reservoir and surroundings of the apparatus.

25. The apparatus of claim 1, further comprising a fluid-containing liner within the casing and surrounding the reservoir.

26. The apparatus of claim 25 in which the fluid-containing liner is formed of flexible plastic material.

27. The apparatus of claim 25 in which the casing provides structural strength and thermal insulation for the apparatus.

28. The apparatus of claim 1, wherein the article container is a beverage container.

29. A method for cooling an article in a receptacle of a refrigeration apparatus, the refrigeration apparatus including a casing surrounding a reservoir, the reservoir filled with a fluid, the reservoir including a cooling region and a headspace disposed substantially above the cooling region and in fluid communication with the cooling regions, the method comprising:
   cooling the fluid stored in the headspace of the reservoir;
   permitting higher density fluid to sink from the headspace of the reservoir into the cooling region of the reservoir located below the headspace;
   wherein the receptacle one of a pair of receptacles wherein the pair of receptacles comprises a tube or pouch having an ends proximal to a pair of opposite openings, the openings defined by apertures disposed in opposite sides of walls of the casing and extending inwardly into the cooling region of the reservoir to join in a middle of the cooling region so as to be submerged therein, during use, the pair of receptacles in thermal communication with the cooling region; and
   wherein the fluid is comprised substantially of water.

30. The method of claim 29, wherein the article is a container in the form of a beverage container sized to fit within the receptacle.

* * * * *